(12) United States Patent
Pehr (10) Patent No.: US 8,726,962 B2
(45) Date of Patent: May 20, 2014

(54) APPARATUS AND METHOD TO MANUFACTURE SHAPED COUNTER TOP EDGES FOR CUSTOM COUNTER TOPS

(71) Applicant: The Diller Corporation, Cincinnati, OH (US)

(72) Inventor: John W. Pehr, Ormond Beach, FL (US)

(73) Assignee: The Diller Corporation, Cincinnati, OH (US)

( * ) Notice: Subject to any disclaimer, the term of this patent is extended or adjusted under 35 U.S.C. 154(b) by 0 days.

(21) Appl. No.: 13/909,329

(22) Filed: Jun. 4, 2013

(65) Prior Publication Data
US 2013/0248115 A1   Sep. 26, 2013

Related U.S. Application Data

(62) Division of application No. 13/136,658, filed on Aug. 8, 2011, now Pat. No. 8,480,835.

(60) Provisional application No. 61/402,777, filed on Sep. 3, 2010.

(51) Int. Cl.
*B29C 65/00* (2006.01)
*B29C 63/04* (2006.01)

(52) U.S. Cl.
USPC ........... 156/475; 156/443; 156/476; 156/492; 156/580; 156/582

(58) Field of Classification Search
CPC ...... B29C 33/20; B29C 33/26; B29C 33/202; B29C 53/04; B29C 53/80; B29C 65/7841; B29C 2063/485; B29C 67/0001; B29L 2031/441
USPC ......... 156/381, 580, 581, 443, 475, 476, 492; 425/409, 450.1, 451.4, 451.5, 451.6
See application file for complete search history.

(56) References Cited

U.S. PATENT DOCUMENTS 547,874 A   10/1895   Brock
671,230 A   4/1901   Painter
(Continued)

FOREIGN PATENT DOCUMENTS

EP   0875179   11/1998
EP   0966342   5/2002
(Continued)

OTHER PUBLICATIONS

Evans Machinery, Inc. Model 0110 Post Former Descriptive Bulletin (2 pages).

(Continued)

*Primary Examiner* — Katarzyna Wyrozebski Lee
*Assistant Examiner* — Carson Gross
(74) *Attorney, Agent, or Firm* — Dinsmore & Shohl LLP (57) ABSTRACT

An apparatus and method to manufacture shaped counter top edges for custom counter tops. Sheet laminate is heated, clamped to a post form mold with clamping screws, and then formed around the post form mold into formed laminate. The formed laminate is then bonded to a substrate using adhesive and a bonding fixture having a plurality of bonding presses. Each bonding press has a pair of mutually opposed bonding press molds, each bonding press mold having a bonding press mold groove sized to admit a formed laminate around an edge of the substrate. Clamps hold the bonding press molds together, thereby urging the formed laminate into intimate contact with the substrate until the adhesive cures. A counter top edge is cut from the resulting substrate/laminate assembly at an edge first cut angle and an edge second cut angle to provide a neat and aesthetically pleasing installation on a counter.

20 Claims, 10 Drawing Sheets

(56) References Cited

U.S. PATENT DOCUMENTS

| | | | |
|---|---|---|---|
| 871,769 A | 11/1907 | Anderson | |
| 882,203 A | 3/1908 | Kelly | |
| 1,381,916 A | 6/1921 | Gunn | |
| 1,864,812 A | 6/1932 | Elmendorf | |
| 1,897,548 A | 2/1933 | Butterworth | |
| 1,945,560 A | 2/1934 | Meyercord | |
| 2,383,556 A * | 8/1945 | Louden et al. | 65/313 |
| 2,412,274 A | 12/1946 | Kloote | |
| 2,648,370 A | 8/1953 | Beach | |
| 2,717,187 A | 9/1955 | Morgan et al. | |
| 2,969,983 A | 1/1961 | De Vore | |
| 3,000,428 A | 9/1961 | Hansen et al. | |
| 3,077,012 A | 2/1963 | Speraw | |
| 3,096,145 A | 7/1963 | Carnaut | |
| 3,668,033 A * | 6/1972 | Evans | 156/212 |
| 3,876,195 A | 4/1975 | Morita | |
| 4,083,743 A | 4/1978 | Degens | |
| 4,406,729 A * | 9/1983 | Elias | 156/479 |
| 4,478,664 A | 10/1984 | Elias | |
| 4,638,843 A | 1/1987 | Sinko | |
| 4,643,237 A | 2/1987 | Rosa | |
| 4,952,445 A | 8/1990 | Dillon | |
| 4,996,817 A | 3/1991 | Nelson | |
| 5,152,856 A | 10/1992 | Thein et al. | |
| 5,156,859 A | 10/1992 | Winkler | |
| 5,157,891 A | 10/1992 | Nelson | |
| 5,165,148 A * | 11/1992 | Fleischer et al. | 24/494 |
| 5,310,435 A | 5/1994 | Kelly | |
| 5,312,504 A | 5/1994 | Jorde | |
| 5,407,515 A | 4/1995 | Singer | |
| 5,419,264 A | 5/1995 | Davis | |
| 5,469,685 A | 11/1995 | Nelson | |
| 5,613,342 A | 3/1997 | Nelson | |
| 5,662,760 A | 9/1997 | Tsuda | |
| 5,944,928 A | 8/1999 | Seidner | |
| 6,143,119 A | 11/2000 | Seidner | |
| 6,183,585 B1 | 2/2001 | Kelley | |
| 6,203,653 B1 | 3/2001 | Seidner | |
| 6,286,577 B1 | 9/2001 | Douglas et al. | |
| 6,309,501 B1 | 10/2001 | Kelley | |
| 6,340,044 B1 | 1/2002 | Beierman et al. | |
| 6,343,454 B1 | 2/2002 | Fisher | |
| 6,773,538 B2 | 8/2004 | Blessing | |
| 6,865,854 B2 | 3/2005 | Tonkin | |
| 6,945,006 B2 | 9/2005 | Stoffer | |
| 7,010,892 B2 | 3/2006 | Tonkin | |
| 7,141,287 B2 | 11/2006 | Blessing | |
| 2001/0046530 A1 | 11/2001 | Toews | |
| 2004/0031568 A1 | 2/2004 | Lin | |
| 2006/0157184 A1 | 7/2006 | Blessing | |
| 2007/0246145 A1 | 10/2007 | Feiertag | |
| 2010/0001622 A1 | 1/2010 | Dunbar | |

FOREIGN PATENT DOCUMENTS

| | | |
|---|---|---|
| JP | 2008-030241 | 2/2008 |
| WO | WO98/41371 | 9/1998 |
| WO | WO99/04944 | 2/1999 |
| WO | WO00/50221 | 8/2000 |
| WO | WO01/12402 | 2/2001 |

OTHER PUBLICATIONS

DE STA CO 334 Pull Action Latch Clamp Descriptive Bulletin (1 page).

Korean Intellectual Property Office Search Report mailed Apr. 20, 2012 in reference to co-pending International Application No. PCT/US2011/001523 filed Aug. 29, 2011.

Notification of Transmittal of the International Search Report and the Written Opinion of the International Searching Authority pertaining to International application No. PCT/US2011/001523 dated Apr. 20, 2012.

* cited by examiner

APPARATUS AND METHOD TO MANUFACTURE SHAPED COUNTER TOP EDGES FOR CUSTOM COUNTER TOPS

CROSS-REFERENCE TO RELATED APPLICATIONS

The present application is a divisional application of U.S. patent application Ser. No. 13/136,658 filed Aug. 8, 2011, which claims the benefit of U.S. Provisional Application Ser. No. 61/402,777, filed Sep. 3, 2010, the entire disclosures of which are hereby incorporated by reference.

TECHNICAL FIELD

This invention relates to counter tops, and in particular to an apparatus and method to manufacture shaped counter top edges for custom counter tops.

BACKGROUND

The manufacture of counter tops is a large industry, worldwide. These top surfaces have many uses: on kitchen counters, bars, tables, bathroom applications, workshops, gardening sheds, light manufacturing—the list goes on.

An ongoing problem associated with sizing counter tops to a specific base is the difficulty in making neat and aesthetically pleasing corners, bump-outs, and cut-outs. Given the wide, formed counter tops on the market today, such turns are difficult to achieve while still maintaining a professional appearance in the finished countertop. This problem is especially acute in the case of custom-manufactured counter tops, which tend to incorporate more corners, bump-outs and cut-outs than would an off-the-shelf counter top. Thus it would be desirable to provide a counter top edge which could be easily glued to the front edge of a counter, and is readily angle-cut to follow counter top corners, bump-outs, and cut-outs.

Another problem associated with existing, mass-produced countertops is their height and width. The finished longitudinal countertop edge tends to feature a downwardly-extending lip intended to hang over the base front upper edge; the finishing veneer extends forwards across the countertop substrate upper surface (typically fiber board), and then curves downwards and backwards to meet the lip lower edge. This creates a thick, bulbous look to the countertop finished edge, which could be as much as a quarter inch thicker than the substrate itself. Thus it would be desirable to provide a counter top edge which is of the same thickness as the substrate itself.

Still another problem associated with mass-produced countertops is the sparcity of counter top edge shapes available—they tend to all have semi-circular or beveled edges. Thus, it would be desirable to provide a method and apparatus capable of producing any desired cross-sectional counter top edge shape, be it semi-circular, oval, regular or irregular polygonal, etc.

Existing Designs

A number of patents have issued for laminates adhered to substrates. U.S. Pat. Nos. 5,662,760, 4,638,843, 4,083,743, 3,096,145, 1,864,812, and 882,203 were granted to Tsuda, Sinko, Degens, Carnaut, Elmendorf, and Kelly respectively. While these patents disclosed methods of adhering laminates to substrates, they all taught flat, rigid, substantially planar laminations. Thus, these methods would not be able to bond a shaped laminate to a shaped substrate edge, which in cross-section could be semi-circular, oval, regular or irregular polygonal, etc.

Butterworth was granted U.S. Pat. No. 1,897,548 for a method of clamping and adhering to produce wood parquet-style structures. While this patent taught means to clamp variously-shaped billets of wood together in order to form a flat assembly, the resultant structure was substantially co-planar and not appropriate for use as a countertop edge.

U.S. Pat. No. 671,230 was granted Painter for a composite glutinous article and process of making same. This patent taught mixing gluten and glycerin together, and then adding body material such as cork. The resultant mixture was pressed together and heated if desired, in order to produce a sheet which exhibited water-proof characteristics as well as flexibility. While this product could be curved, it would not be appropriate for use as a countertop edge, due to its flexibility and lack of defined shape.

Thus, it would be desirable to produce a countertop edge which is easily angle-cut to accommodate countertop edges, bump-outs, and cut-outs, and is the same thickness as the countertop to which it is to be adhered.

SUMMARY

Accordingly, it is an object of the present invention to provide an apparatus and method to manufacture shaped counter top edges for custom counter tops. Design features allowing this object to be accomplished include a post form mold having a post form mold shaping face corresponding to the desired cross-sectional shape of the finished counter top edge on which sheet laminate is formed into formed laminate (after allowance for formed laminate spring back), and a substrate having a substrate shaped edge having the same cross-sectional shape, to which the formed laminate is adhered using adhesive and a bonding fixture. Advantages associated with the accomplishment of this object include the ability to manufacture counter top edge having any desired cross-sectional shape, be it semi-circular, oval, regular or irregular polygonal, etc.

It is another object of the present invention to provide an apparatus and method to manufacture shaped counter top edges for custom counter tops of the same thickness as a counter top to which the counter top edges is to be adhered. Design features allowing this object to be accomplished include a post form mold having a post form mold shaping face corresponding to the desired cross-sectional shape of the finished counter top edge on which sheet laminate is formed into formed laminate (after allowance for formed laminate spring back), and a substrate having a substrate shaped edge having the same cross-sectional shape, to which the formed laminate is adhered using adhesive and a bonding fixture, thus forming a substrate/laminate assembly, the thickness of the substrate/laminate assembly being substantially equal to the counter top thickness to which the counter top edge is to be adhered. Benefits associated with the accomplishment of this object include providing a thinner finished counter top, which has the appearance of a single monolithic slab, and the associated increased aesthetics of the finished product. For example, the counter top and counter top edge could be manufactured to look like a slab of granite or marble.

It is still another object of this invention to provide an apparatus and method to manufacture shaped counter top edges for custom counter tops which is readily, and virtually seamlessly, bondable to an existing counter top. Design features enabling the accomplishment of this object include cutting the finished counter top edge to have a counter top upper face angle and a counter top lower face angle, both slightly less than ninety degrees. Advantages associated with the realization of this object include neater installation of the counter top edge to the counter top, virtually seamless finish at the junction, and the increased aesthetics of the finished counter top/edge combination.

It is yet another object of this invention to provide an apparatus and method to manufacture shaped counter top edges for custom counter tops which is inexpensive to produce. Design features allowing this object to be achieved include the use of components made of readily available materials, and off-the-shelf apparatus and materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings. Ten sheets of drawings are provided. Sheet one contains FIGS. 1, 2 and 3. Sheet two contains FIGS. 4. 5 and 6. Sheet three contains FIGS. 7 and 8. Sheet four contains FIG. 9. Sheet five contains FIGS. 10 and 11. Sheet six contains FIGS. 12 and 13. Sheet seven contains FIGS. 14 and 15. Sheet eight contains FIGS. 16 and 17. Sheet nine contains FIGS. 18, 19 and 20. Sheet ten contains FIGS. 21 and 22.

DETAILED DESCRIPTION

The instant apparatus and method to manufacture shaped counter top edges for custom counter tops comprises three principal steps: first, forming sheet laminate 2 into formed laminate 4; second, adhering formed laminate(s) 4 to substrate 30 to produce substrate/laminate assembly 40; and third, cutting counter top edge 90 from substrate/laminate assembly 40 at the correct cut angles.

Figure 18:
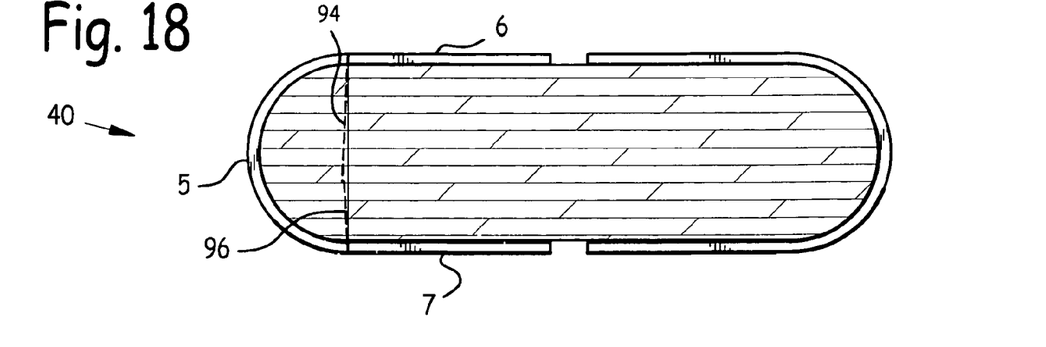
FIG. 18 is an end view of a substrate/laminate assembly, an edge first cut, and an edge second cut.
Figure 19:
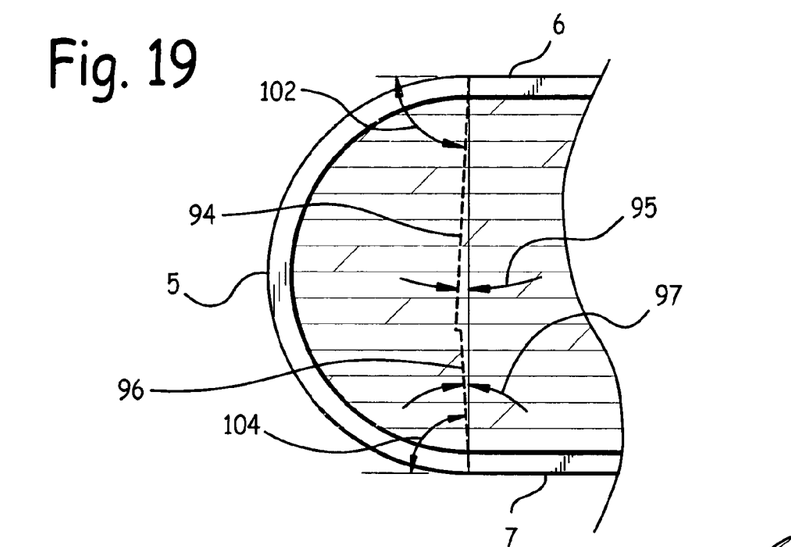
FIG. 19 is an end view of a substrate/laminate assembly, an edge first cut at an edge first cut angle, and an edge second cut at an edge second cut angle.
Figure 20:
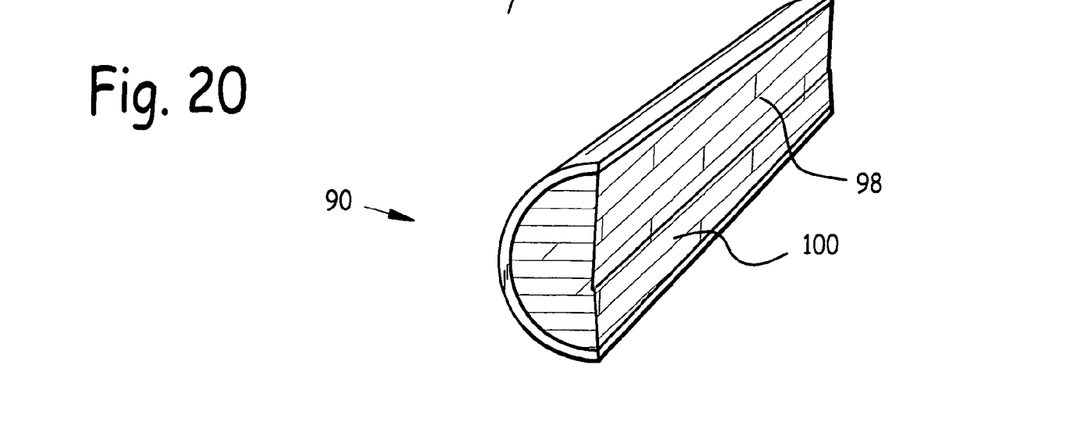
FIG. 20 is a right side quarter isometric view of a counter top edge which was produced by the instant apparatus and method.
Figure 21:
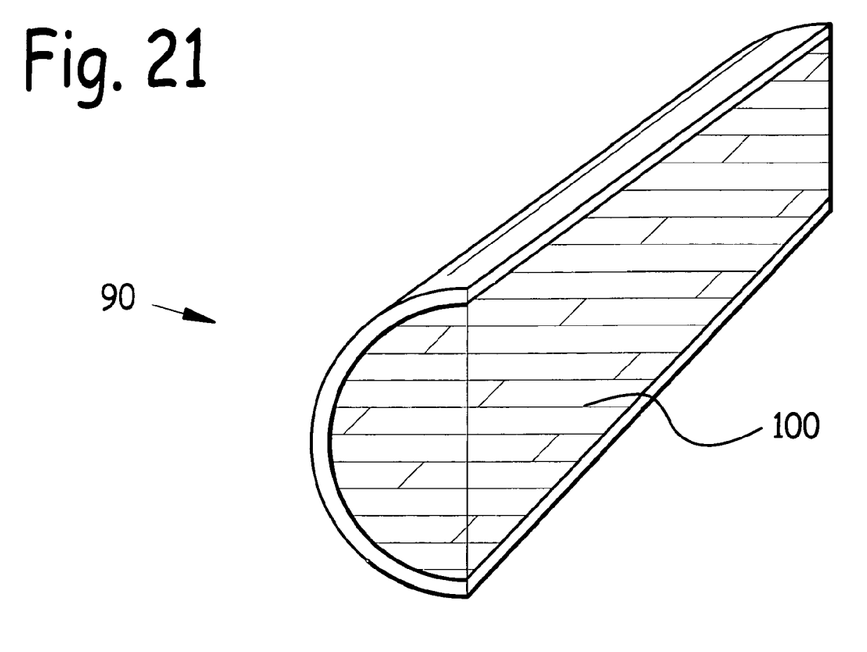
FIG. 21 is a right quarter side elevated isometric view of an alternate embodiment counter top edge having a flat face.
Figure 22:
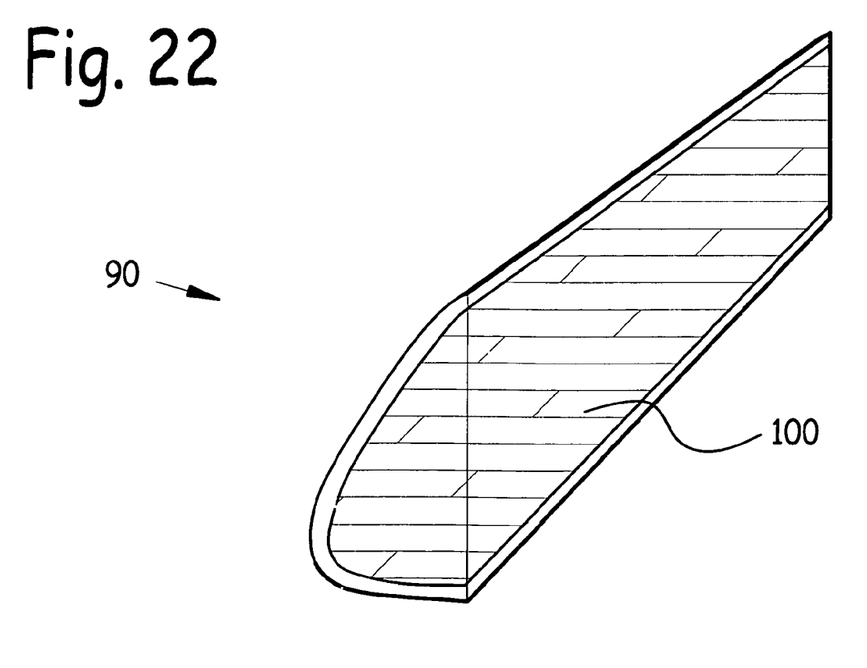
FIG. 22 is a right quarter side elevated isometric view of an alternate embodiment counter top edge having a flat face and an alternate edge shape.

FIGS. 1-6 depict the apparatus and method steps in the formation of substantially planar sheet laminate 2 into formed laminate 4. FIGS. 7-17 depict the apparatus and method steps of adhering formed laminate 4 to substrate 30 to produce substrate/laminate assembly 40. FIGS. 18-20 depict the method steps of cutting counter top edge 90 from substrate/laminate assembly 40. FIGS. 21 and 22 depict alternate embodiments of counter top edge 90. The apparatus and method of these three principal steps will be described below sequentially.

Figure 1:
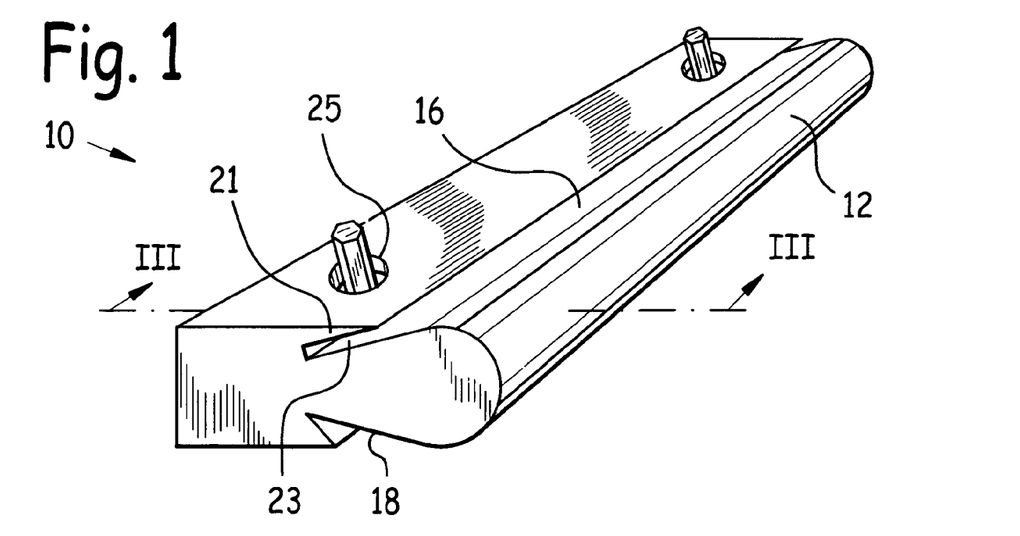
FIG. 1 is a right side quarter elevated isometric view of a post form mold.
Figure 2:
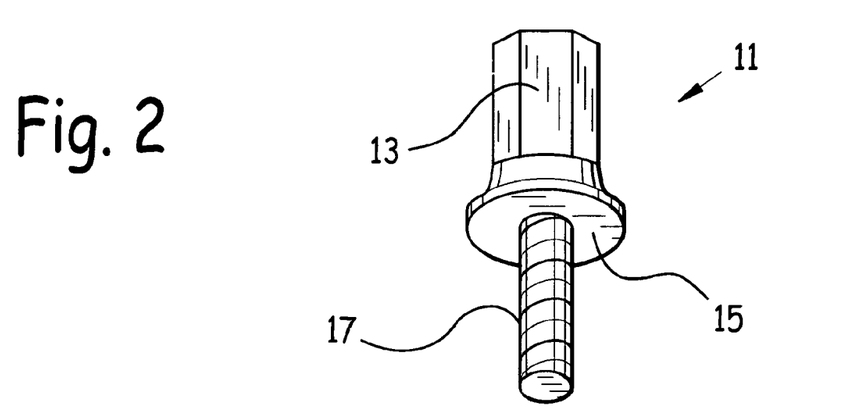
FIG. 2 is a side isometric view of a clamping screw.
Figure 3:
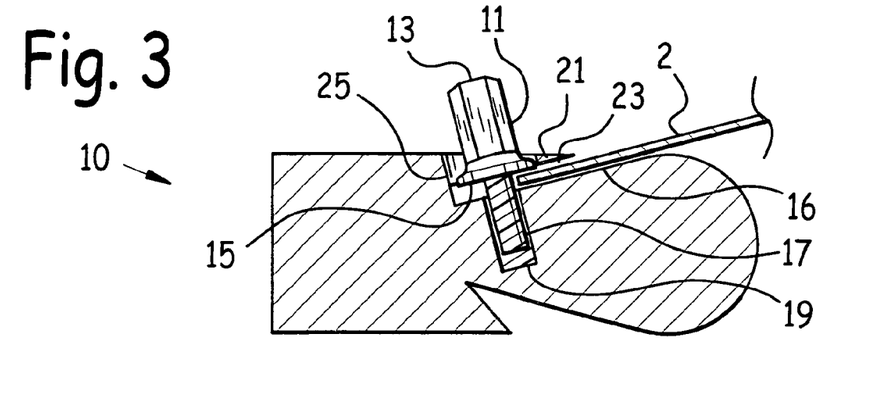
FIG. 3 is a side cross-sectional view of a post form mold taken at section III-III of FIG. 1, with a sheet laminate clamped in its post form mold slot.

FIG. 1 is a right side quarter elevated isometric view of post form mold 10. FIG. 2 is a side isometric view of clamping screw 11. FIG. 3 is a cross-sectional view of post form mold 10 taken at section III-III of FIG. 1, with sheet laminate 2 clamped in its post form mold slot 23 by means of clamping screw 11.

Figure 4:
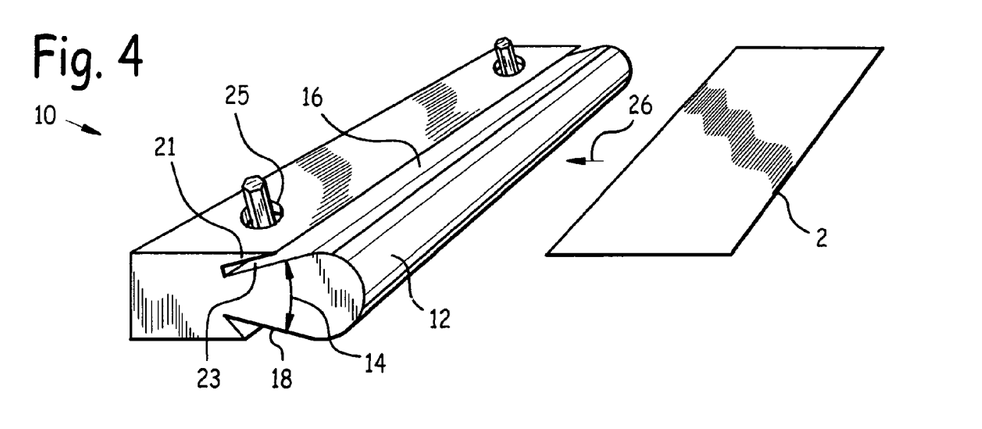
FIG. 4 is a right side quarter elevated isometric view of a sheet laminate about to be formed around a post form mold.
Figure 5:
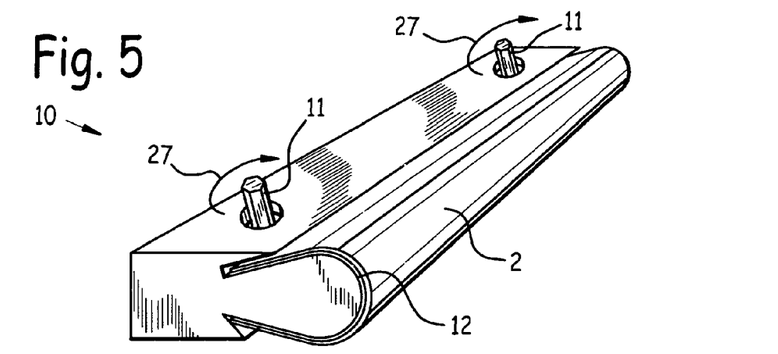
FIG. 5 is a right side quarter elevated isometric view of a sheet laminate formed around a post form mold.
Figure 6:
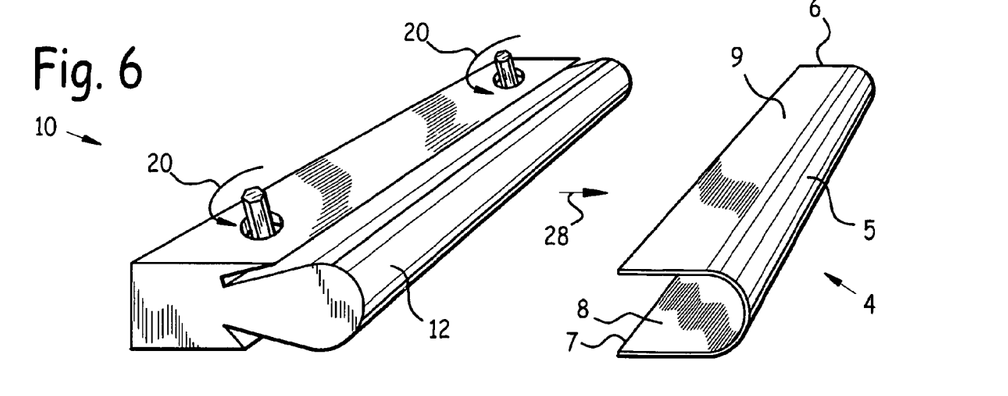
FIG. 6 is a right side quarter elevated isometric view of a formed laminate removed from the post form mold around which it was formed.

FIG. 4 is a right side quarter elevated isometric view of sheet laminate 2 about to be formed around post form mold 10. FIG. 5 is a right side quarter elevated isometric view of sheet laminate 2 formed around post form mold 10. FIG. 6 is a right side quarter elevated isometric view of formed laminate 4 removed from the post form mold 10 around which it was formed. Sheet laminate 2 may be formed around post form mold 10 into formed laminate 4 using a conventional, commercially available, post form machine (e.g. Evans Machinery, Inc. Model 0110 Post Former, etc.). Sheet laminate 2 may be any appropriate post formable sheet laminate (e.g. in the order of 0.039-0.049 inch thick Formica™, Nevamar™, Wilsonart™ International, etc.) In the preferred embodiment, such commercially available post form machine was modified by the addition of clamping screw 11, post form mold threaded bore 19, and post form mold upper lip bore 25.

Referring now to FIGS. 1-6, post form mold 10 comprises post form mold shaping face 12, substantially planar post form mold upper face 16 disposed adjacent and tangent to an upper edge of post form mold shaping face 12, and substantially planar post form mold lower face 18 disposed adjacent and tangent to a lower edge of post form mold shaping face 12.

Post form mold upper lip 21 runs lengthwise along post form mold 10 opposite post form mold upper face 16, and together with post form mold upper face 16 defines post form mold slot 23. Post form mold slot 23 runs lengthwise along an edge of post form mold upper face 16 opposite post form mold shaping face 12. Post form mold upper lip 21 is the upper wall of post form mold slot 23; post form mold upper face 16 is the lower wall of post form mold slot 23. During the forming process, post form mold slot 23 is sized to admit sheet laminate 2 as depicted in FIG. 3.

Clamping screw(s) 11 serve to immobilize sheet laminate 2 in post form mold slot 23 during the forming process, as depicted in FIG. 3. Clamping screw 11 comprises threaded stud 17 extending perpendicularly from substantially planar clamping screw land 15. Clamping screw head 13 extends from clamping screw land 15 opposite clamping screw threaded stud 17. In the preferred embodiment, a cross-sectional shape of clamping screw head 13 was polygonal, e.g. square or hexagonal.

A post form mold threaded bore 19 corresponding to each clamping screw 11 is disposed in post form mold upper face 16 under post form mold upper lip 21. Each post form mold threaded bore 19 is sized to mate with a corresponding clamping screw threaded stud 17. A post form mold upper lip bore 25 is disposed through post form mold upper lip 21, corresponding to each clamping screw 11, and overlying an associated post form mold threaded bore 19. Each post form mold upper lip bore 25 is sized to admit clamping screw land 15 and clamping screw head 13.

In use, clamping screw threaded stud 17 is threaded into post form mold threaded bore 19 until clamping screw land 15 is substantially co-planar with the upper wall of post form mold slot 23, into the position depicted in FIG. 3. An edge of sheet laminate 2 is then inserted into post form mold slot 23 as indicated by arrow 26 in FIG. 4, until the edge of sheet laminate 2 underlies clamping screw land 15, as depicted in FIG. 3.

Then clamping screw(s) 11 are tightened onto sheet laminate 2 as depicted by arrows 27 in FIG. 5, thus securely clamping sheet laminate 2 in place for the duration of the molding process. When clamped in place on post form mold 10, the edge of sheet laminate 2 underlying each clamping screw land 15 is securely clamped between such clamping screw land 15 and post form mold upper face 16. After sheet laminate 2 has been shaped, clamping screws 11 are unscrewed as indicated by arrow 20 in FIG. 6, to the extent necessary to slide formed laminate 4 from post form mold slot 23, as indicated by arrow 28 in FIG. 6.

During the forming process, heat is applied to sheet laminate 2 to soften it, then sheet laminate 2 is clamped into intimate contact with post form mold upper face 16, post form mold shaping face 12, and post form mold lower face 18. Depending on the specific laminate used, and its thickness, the heating time and temperature of laminate 2 may vary, as may the clamping time of sheet laminate 2 on post form mold 10. For example, one commonly used laminate is heated at 300 degrees-350 degrees Fahrenheit for a period of 20±10 seconds, and then clamped onto post form mold 1.0 for a period of 20±10 seconds. The times and temperatures may vary depending on the specific material used, and its thickness.

Sheet laminate 2 is then unclamped from post form mold 10, and the resultant, unclamped laminate emerges as formed laminate 4 as indicated by arrow 28 in FIG. 6. Formed laminate 4 comprises formed laminate spine 5, substantially planar formed laminate upper leg 6 disposed adjacent and tangent to an upper edge of formed laminate spine 5, and substantially planar formed laminate lower leg 7 disposed adjacent and tangent to a lower edge of formed laminate spine 5.

Formed laminate upper leg 6 is substantially parallel to formed laminate lower leg 7. While the figures depict a cross-sectional shape of formed laminate spine 5 as an arc of a circle, it is intended to fall within the scope of this disclosure that the cross-sectional shape of formed laminate spine 5 be any desired shape, including but not limited to ovoid, egg-shaped, circular, regular or irregular polygonal, etc.

Similarly, while the figures depict a cross-sectional shape of post form mold shaping face 12 as an arc of a circle, it is intended to fall within the scope of this disclosure that the cross-sectional shape of post form mold shaping face 12 be any desired shape, including but not limited to ovoid, egg-shaped, circular, regular or irregular polygonal, etc., so as to be able to produce correspondingly formed laminate spine 5 of the desired cross-sectional shapes. Thus, the cross-sectional shapes of post form mold shaping face 12 and formed laminate spine 5 will be substantially the same, because post form mold shaping face 12 determines the shape of formed laminate spine 5 during the forming process described above.

Due to material memory ("spring back") inherent in sheet laminate 2, sheet laminate 2 must be formed to a greater shaped angle than desired in the finished formed laminate 4, so that when formed laminate 4 springs back after being unclamped from post form mold 10, formed laminate upper leg 6 and formed laminate lower leg 7 are substantially parallel. Accordingly, post form mold upper face 16 is disposed at a post form mold face angle 14 to post form mold lower face 18. While post form mold face angle 14 may vary with the material and thickness of sheet laminate 2, in the preferred embodiment post form mold face angle was 30 degrees±10 degrees.

As may be observed in FIG. 6, formed laminate 4 comprises formed laminate inside surface 8 on its concave surface, and formed laminate outside surface 9 on its convex surface. When formed laminate 4 is to be adhered to substrate 30, adhesive 22 is applied to formed laminate inside surface 8, and then formed laminate 4 is clamped onto substrate 30 until adhesive 22 cures. Adhesive 22 may be applied to formed laminate inside surface 8 by any appropriate means, including spraying, brushing, etc.

Figure 7:
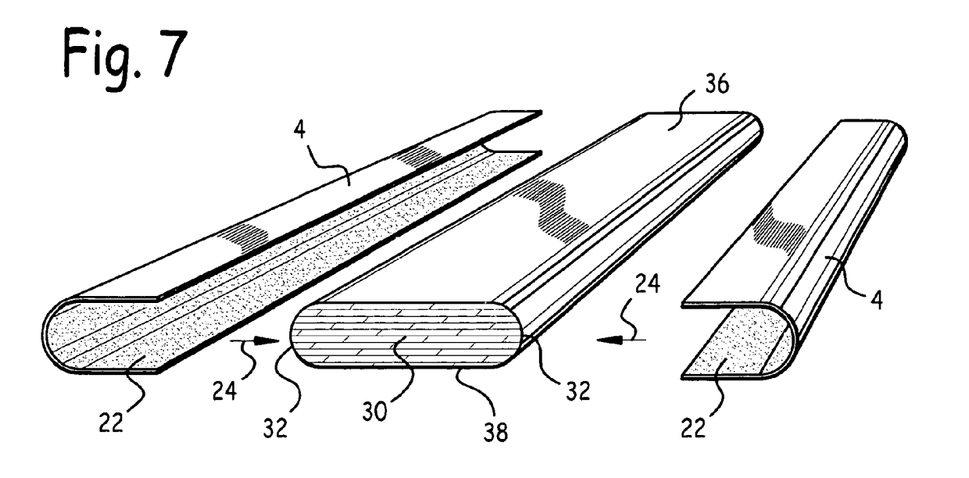
FIG. 7 is a right side quarter elevated isometric view of a pair of formed laminates bearing adhesive, ready to be adhered to a substrate.
Figure 8:
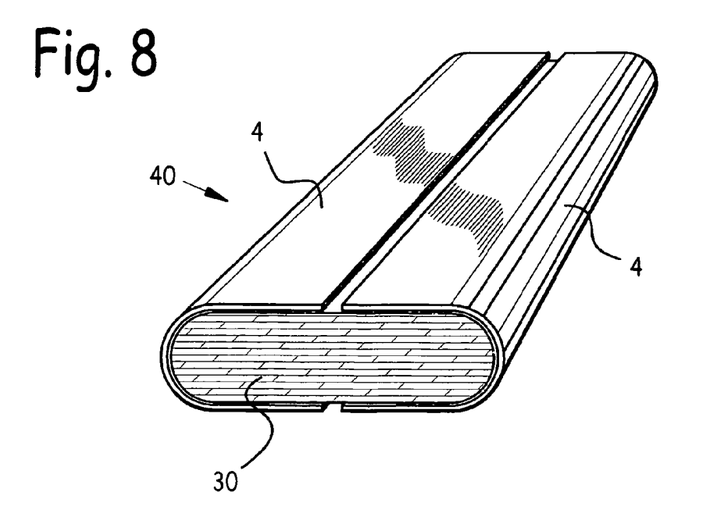
FIG. 8 is a right side quarter elevated isometric view of a pair of formed laminates adhered to a substrate.

FIG. 7 is a right side quarter elevated isometric view of a pair of formed laminates 4 bearing adhesive 22, ready to be adhered to substrate 30. FIG. 8 is a right side quarter elevated isometric view of a pair of formed laminates 4 adhered to a substrate 30, thereby forming substrate/laminate assembly 40.

Substrate 30 may be wood, particle board, synthetic, or any other appropriate material to which formed laminate 4 may be adhered, which may serve as the substrate 30 of counter top edge 90. Substrate 30 comprises substantially planar substrate upper face 36, substantially planar lower face 38, a first substrate shaped edge 32 disposed along a first edge of substrate upper face 36 and a first edge of substrate lower face 38, and a second substrate shaped edge 32 disposed along a second edge of substrate upper face 36 and a second edge of substrate lower face 38. In the preferred embodiment, the plan view shape of substrate upper face 36 and substrate lower face 38 was rectangular, upper face 36 coextended with substrate lower face 38, substrate upper face 36 first edge was substantially parallel with substrate lower face 38 first edge, and substrate upper face 36 second edge was opposite lower face 38 second edge and substantially parallel with substrate lower face 38 second edge, which in turn was opposite the substrate lower face 38 first edge.

The cross-sectional shape of formed laminate spine 5 is substantially the same as the cross-sectional shape of substrate shaped edge 32. Formed laminate 4 is sized to slidably admit substrate shaped edge 32 and a part of substrate upper face 36 and substrate lower face 38 adjacent substrate shaped edge 32. Thus, the cross-sectional shape of substrate shaped edge 32 is cut, sanded, planed, formed, milled, or produced using any other appropriate production method, to be the desired cross-sectional shape of the resultant counter top edge 90, as may be seen in FIGS. 20-22. Post form mold shaping face 12 is produced to substantially mirror the cross-sectional shape of substrate shaped edge 32 (except for post form mold face angle 14, to account for spring back in formed laminate 4 when it is removed from post form mold 10), in order to produce formed laminate 4 which has the same cross-sectional shape as, and is sized to slidably admit, substrate shaped edge 32 and the parts of substrate upper face 36 and substrate lower face 38 adjacent substrate shaped edge 32.

In order to produce the substrate/laminate assembly 40 depicted in FIG. 8, adhesive 22 is applied to formed laminate inside surface 8 of each formed laminate 4, formed laminates 4 are emplaced over substrate shaped edges 32 as indicated by arrows 24 in FIG. 7, and then each formed laminate 4 is clamped over a corresponding substrate shaped edge 32 until adhesive 22 cures.

FIGS. 9-17 depict the bonding fixture 50 apparatus for clamping formed laminate(s) 4 to substrate 30 until adhesive 22 cures.

Figure 9:
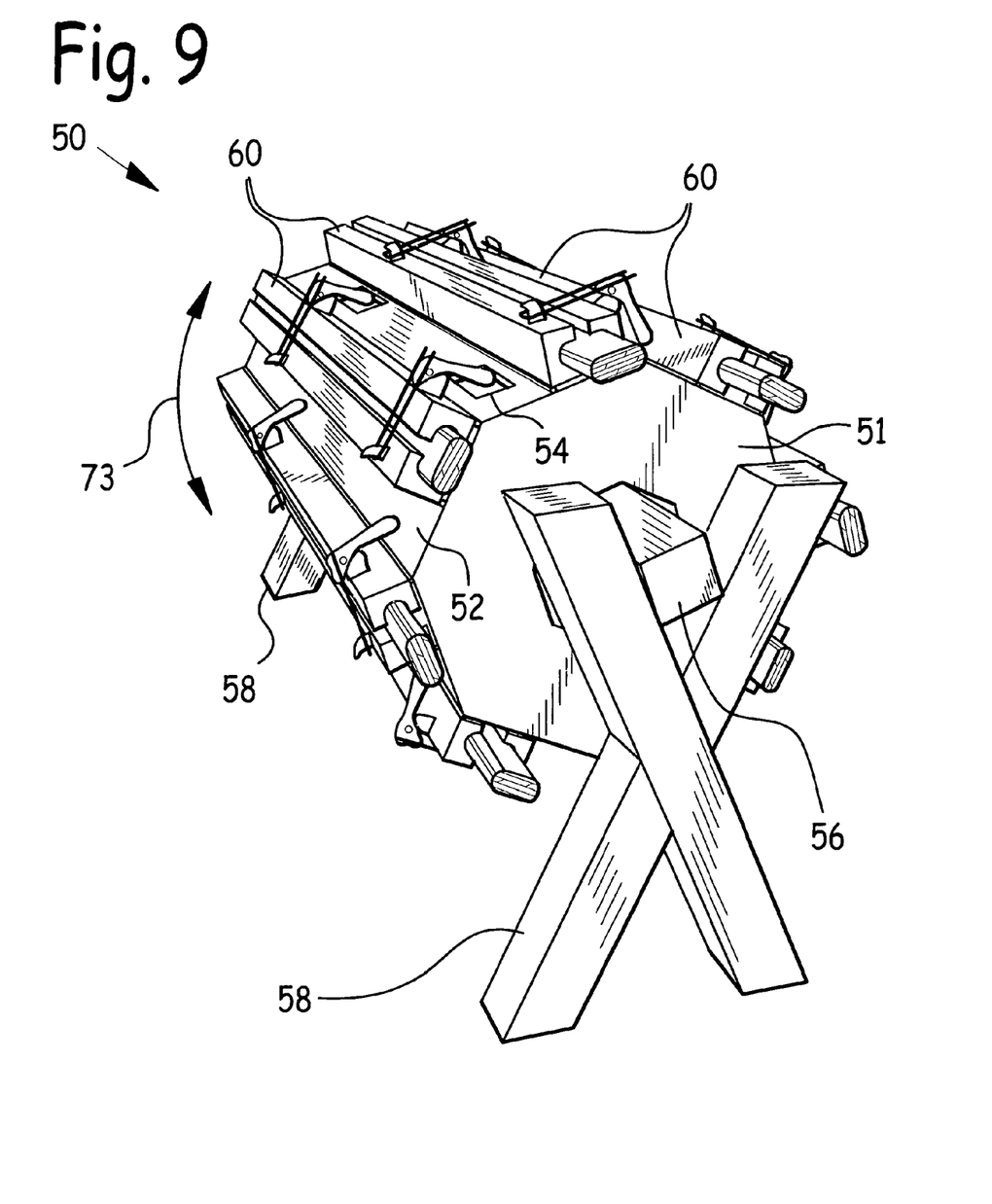
FIG. 9 is a left side quarter elevated isometric view of a bonding fixture comprising a plurality of bonding presses mounted circumferentially around a pair of bonding fixture ends, and a bonding fixture spindle extending through the bonding fixture ends, supported by a bonding fixture base.

FIG. 9 is a left side quarter elevated isometric view of bonding fixture 50 comprising a plurality of bonding presses 60 mounted circumferentially around a pair of bonding fixture ends 51. Bonding fixture spindle 56 extends through bonding fixture ends 51 and rests on bonding fixture bases 58. Bonding fixture spindle 56 permits bonding fixture 50 to rotate relative to bonding fixture bases 58. Due to the rotatable attachment between bonding fixture 50 and bonding fixture to bases 58, bonding fixture 50 can be rotated as indicated by arrow 73 in FIG. 9 to provide easy access to any of its bonding presses 60 for insertion, clamping, and removal of formed laminates 4 around corresponding substrates 30.

Figure 10:
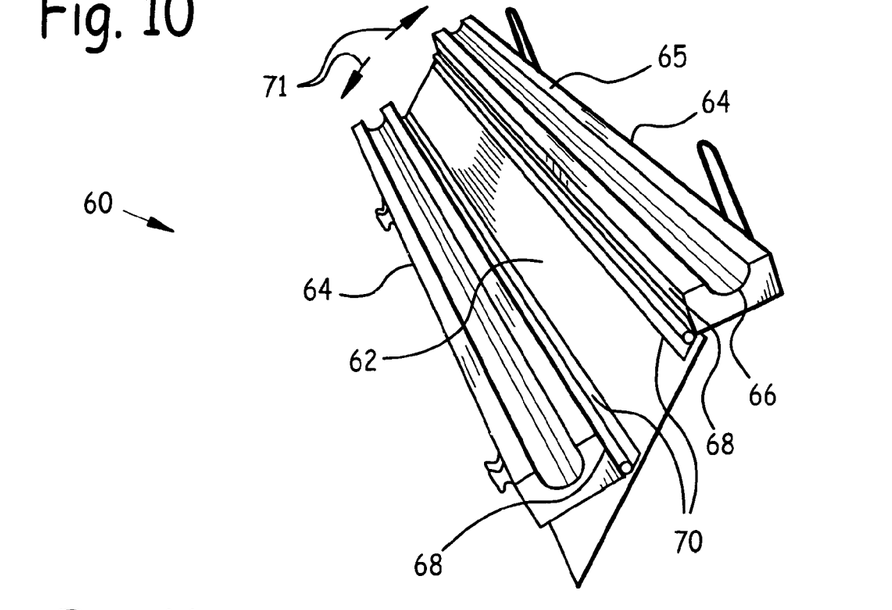
FIG. 10 is a left side quarter isometric view of a bonding press in the open position, ready to receive a substrate/laminate assembly.
Figure 11:
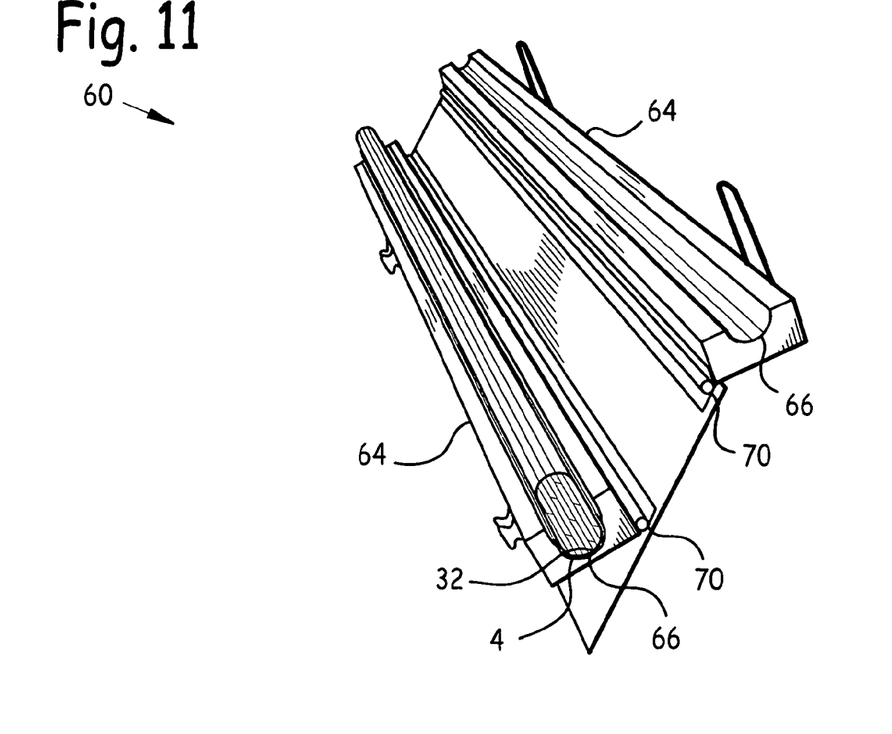
FIG. 11 is a left side quarter isometric view of a bonding press in the open position, with a first formed laminate and substrate shaped edge inserted into a first bonding press groove.

FIG. 10 is a left side quarter isometric view of bonding press 60 in the open position, ready to receive formed laminates 4 and substrate 30. FIG. 11 is a left side quarter isometric view of bonding press 60 in the open position, with a first formed laminate 4 and substrate shaped edge 32 inserted into a first bonding press groove 66.

Figure 12:
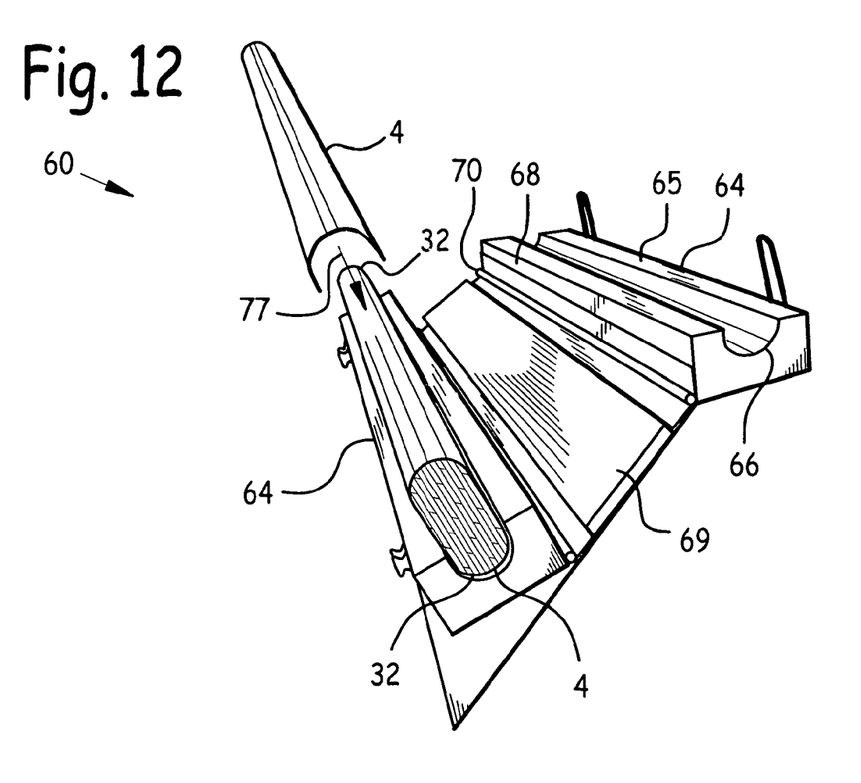
FIG. 12 is a left side quarter isometric view of a bonding press mold containing a first formed laminate and a first substrate shaped edge, and additionally depicting a second formed laminate about to be emplaced on a second substrate shaped edge.
Figure 13:
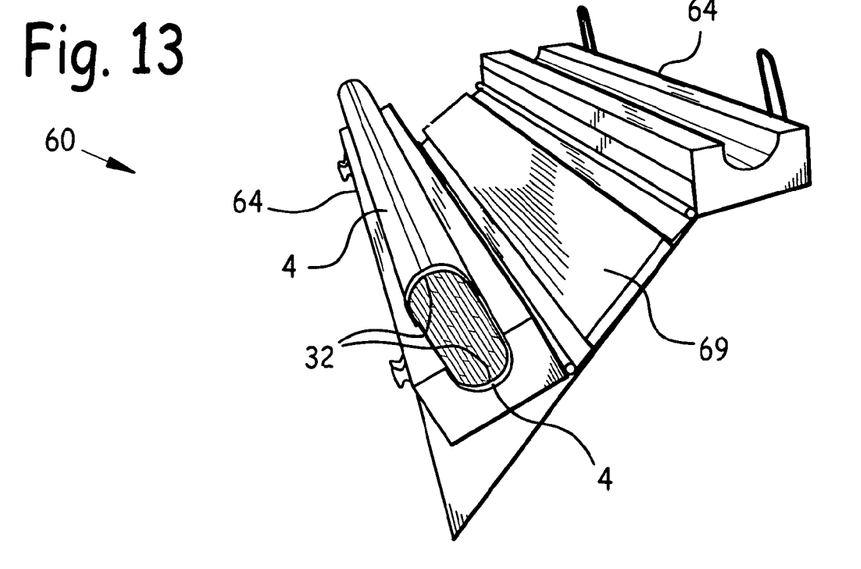
FIG. 13 is a left side quarter isometric view of a bonding press mold containing a first formed laminate on a first substrate shaped edge, and additionally depicting a second formed laminate emplaced on a second substrate shaped edge.

FIG. 12 is a left side quarter isometric view of bonding press mold 64 containing a first formed laminate 4 and a first substrate shaped edge 32, and additionally depicting a second formed laminate 4 about to be emplaced on a second substrate shaped edge 32. FIG. 13 is a left side quarter isometric view of bonding press 60 with a bonding press mold 64 containing a first formed laminate 4 on a first substrate shaped edge 32, and additionally depicting a second formed laminate 4 emplaced on a second substrate shaped edge 32.

Figure 14:
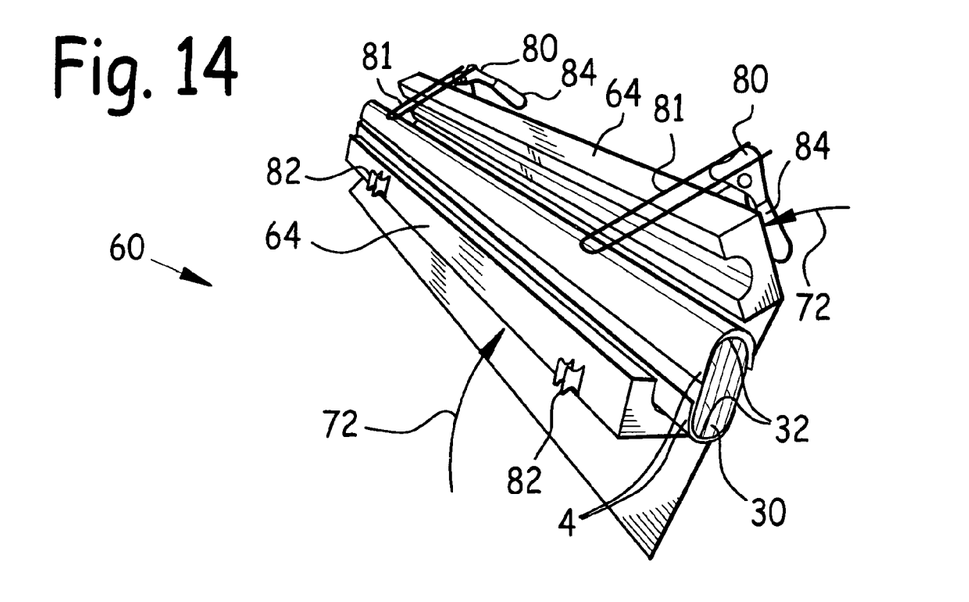
FIG. 14 is a left side quarter isometric view of a bonding press closing on a first formed laminate on a first substrate shaped edge, and on a second formed laminate on a second substrate shaped edge.
Figure 15:
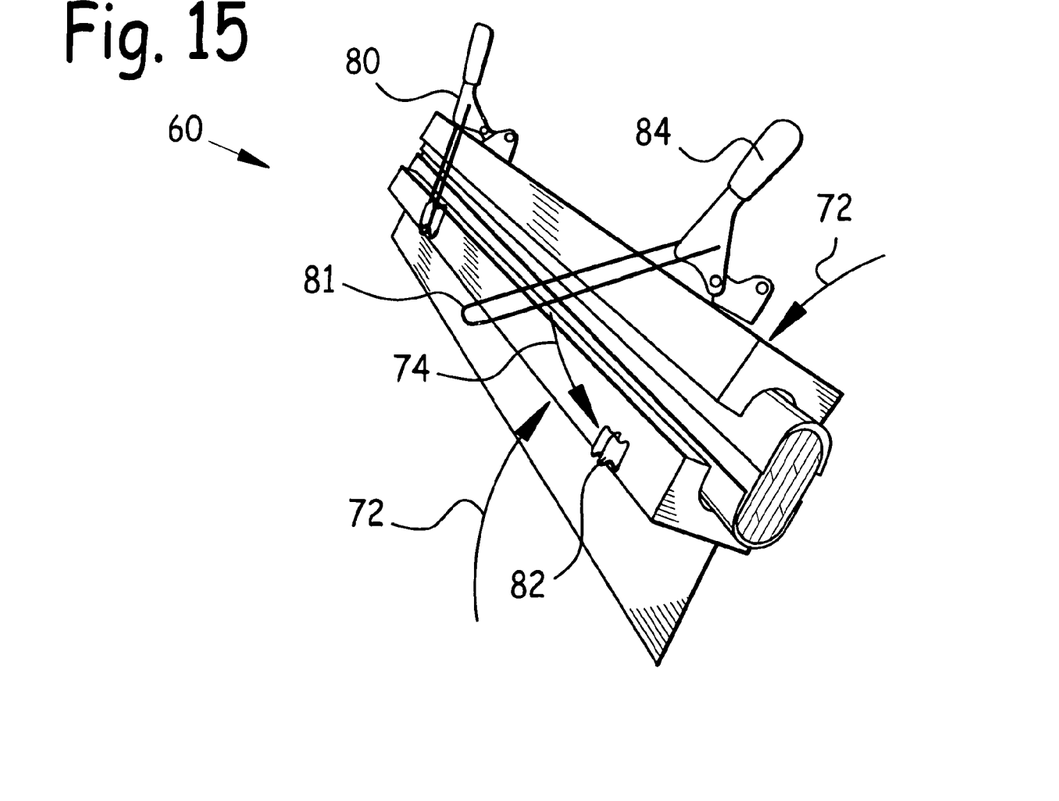
FIG. 15 is a left side quarter isometric view of a bonding press closed on a first formed laminate on a first substrate shaped edge, and on a second formed laminate on a second substrate shaped edge, with a first clamp engaged, and a second clamp moving towards engagement with its clamp hasp.

FIG. 14 is a left side quarter isometric view of bonding press 60 closing on a first formed laminate 4 on a first substrate shaped edge 32, and a second formed laminate 4 on a second substrate shaped edge 32, as indicated by arrows 72. FIG. 15 is a left side quarter isometric view of bonding press 60 closed on a first formed laminate 4 on a first substrate shaped edge 32 and a second formed laminate 4 on a second substrate shaped edge 32, with a first clamp 80 engaged and a second clamp 80 having its clamp arm 81 moving towards engagement with its clamp hasp 82.

Figure 16:
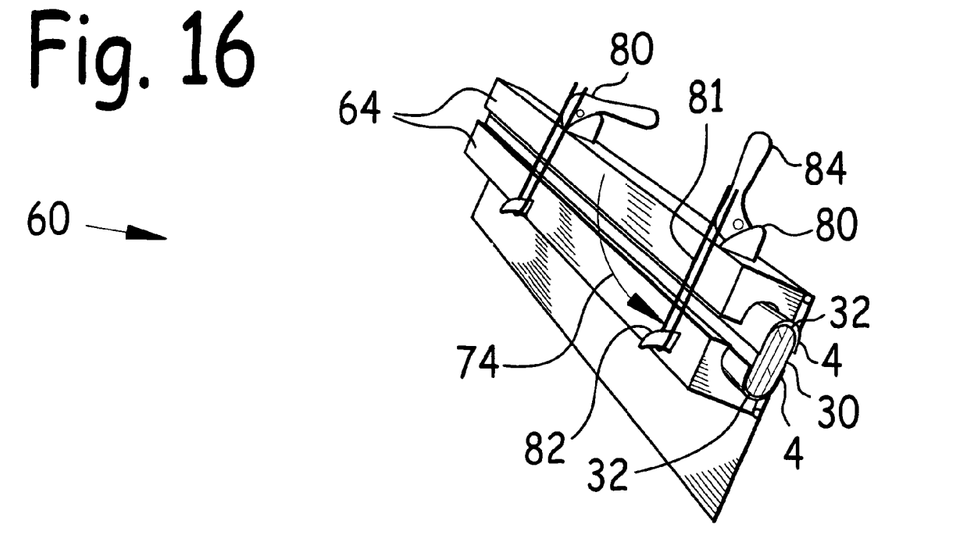
FIG. 16 is a left side quarter isometric view of a bonding press closed on a first formed laminate on a first substrate shaped edge, and on a second formed laminate on a second substrate shaped edge, with a first clamp tightened, and a second clamp having its clamp arm engaged with its clamp hasp about to be tightened.

FIG. 16 is a left side quarter isometric view of bonding press 60 closed on a first formed laminate 4 on a first substrate shaped edge 32 and a second formed laminate 4 on a second substrate shaped edge 32, with a first clamp 80 tightened, and a second clamp 80 having its clamp arm 81 engaged with its clamp hasp 82, about to be tightened.

Figure 17:
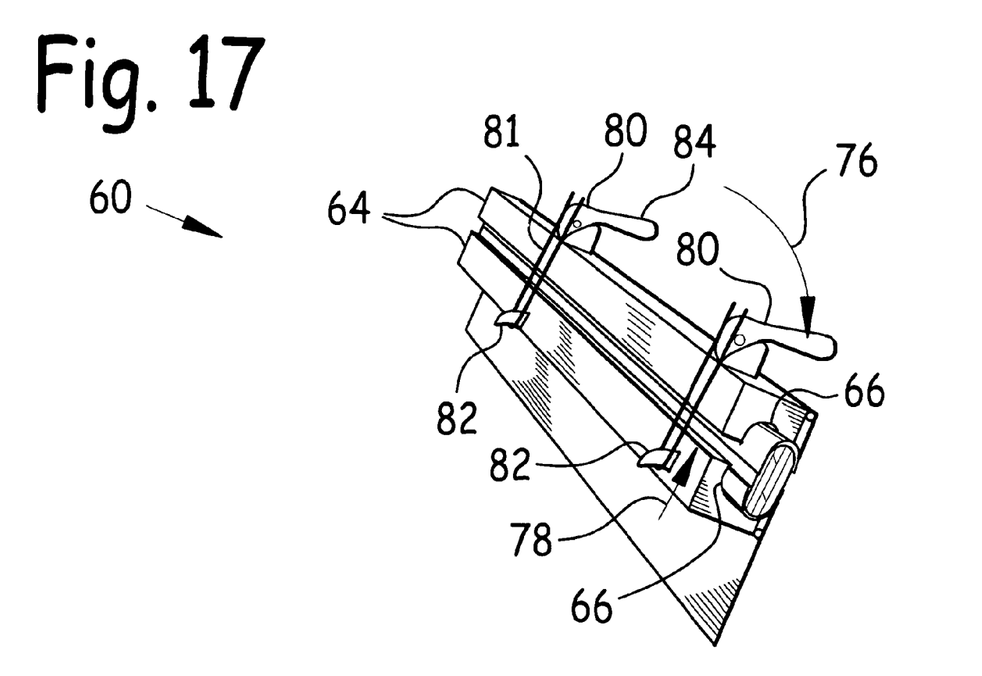
FIG. 17 is a left side quarter isometric view of a bonding press closed on a first formed laminate on a first substrate shaped edge, and on a second formed laminate on a second substrate shaped edge, with its clamps engaged and tightened.

FIG. 17 is a left side quarter isometric view of bonding press 60 closed on a first formed laminate 4 on a first substrate shaped edge 32 and a second formed laminate 4 on a second substrate shaped edge 32, with its clamps 80 engaged and tightened.

Referring to these figures, we may observe that bonding fixture 50 comprises a plurality of elongate and substantially parallel bonding fixture faces 52 disposed long edge-to-long edge. In the preferred embodiment bonding fixture faces 52 were rectangular, and the cross-sectional shape of bonding fixture 50 was a polygon, where each side was a bonding fixture face 52. For example, the cross-sectional shape of the bonding fixture 50 depicted in FIG. 9 is octagonal. Therefore the bonding fixture 50 depicted in FIG. 9 has a total of eight bonding fixture faces 52, and a total of eight bonding presses 60 attached, one to each bonding fixture face 52.

A bonding press 60 is attached to each bonding fixture face 52. Each bonding press 60 comprises an elongate bonding press spine 62, a first bonding press mold 64 hingeadly attached to bonding press spine 62 with a bonding press hinge 70, and a second bonding press mold 64 hingeadly attached to bonding press spine 62 with a bonding press hinge 70. Each bonding press spine 62 is attached to a corresponding bonding fixture face 52, although it is intended to fall within the scope of this disclosure that bonding press spine 62 may be the same element as bonding fixture face 52.

Each bonding press mold 64 comprises a substantially planar bonding press mold face 65 adjacent to and, substantially perpendicular to, a bonding press mold foot 68. A bonding press mold groove 66 is disposed in each bonding press mold face 65. Each bonding press mold groove 66 is sized to admit a formed laminate 4 on a substrate shaped edge 32, as may be observed in FIGS. 11-17. Therefore, the cross-sectional shape of bonding press mold groove 66 is substantially the same as the cross-sectional shape of formed laminate 4 and substrate shaped edge 32.

While in the instant figures the cross-sectional shape of bonding press mold groove 66, formed laminate 4, and substrate shaped edge 32 is depicted as being a circular arc, it is intended to fall within the scope of this disclosure that their cross-sectional shapes be any appropriate cross-sectional shape, including but not limited to ovoid, circular, irregular, polygonal, etc. Of course, in order to produce a formed laminate of appropriate cross-sectional shape, the cross-sectional shape of post form mold shaping face 12 must also match the cross-sectional shape of bonding press mold groove 66, formed laminate 4, and substrate shaped edge 32, after incorporating a post form mold face angle of 30 degrees±10 degrees into post form mold 10 as described above.

Each bonding press mold 64 is hingeably attached to bonding press spine 62 parallel to a long edge of bending press spine 62, at an intersection of bonding press mold face 65 and bonding press mold foot 68. When bonding press molds 60 are in the clamping position depicted in FIGS. 9 and 15-17, bonding press mold feet 68 are substantially mutually coplanar, and resting as stops flat against bonding press spine 62 and/or bonding press hinges 70. In the clamping position, bonding press mold grooves 66 are disposed directly opposite each other, and substantially equidistant from bonding press spine 62.

Referring now to FIG. 14, each bonding press mold 60 further comprises at least one clamp 80 attached to a first bonding press mold 64, and a clamp hasp 82 corresponding to each clamp 80 attached to a second bonding press mold 64 opposite the clamp 80 to which it corresponds.

Each clamp 80 comprises a rotating clamp arm 81 and a clamp handle 84. Rotation of clamp handle 84 as indicated by arrow 76 is FIG. 17 has the effect of tightening clamp arm 81 on a corresponding clamp hasp 82 as indicated by arrow 78 in FIG. 17. In the preferred embodiment clamps 80 were commercially available pull action latch clamps.

Thus, as depicted in FIGS. 9-17, bonding fixture 50 is first rotated relative to bonding fixture bases 58 as indicated by arrow 73 in FIG. 9 into an angular orientation which provides easy access to a bonding press 60 sought to be used. Bonding press 60 bonding press molds 64 are then rotated away from each other into the open position as indicated by arrows 71 in FIG. 10.

Adhesive 22 is then applied to the formed laminate inside surface 8 of a first formed laminate 4 as previously described, the first formed laminate 4 is then placed over a first substrate shaped edge 32, and then the first laminate 4 and first substrate shaped edge 32 are emplaced in a bonding press mold groove 66 in a first bonding press mold face 65, as shown in FIG. 11.

Next, adhesive 22 is applied to the formed laminate inside surface 8 of a second formed laminate 4 as previously described, and the second formed laminate 4 is then placed over a second substrate shaped edge 32, as indicated by arrow 77 in FIG. 12.

Then the first and second bonding press molds 64 are rotated towards each other into the closed position as indicated by arrows 72 in FIGS. 14 and 15, until the second formed laminate 4 and second substrate shaped edge 32 are disposed within the bonding press mold groove 66 in a second bonding press mold face 65, and both bonding press mold feet 68 butt up flat against bonding press spine 62 and/or bonding press hinge 70, as shown in FIGS. 15-17.

Each clamp arm 81 is then engaged with a corresponding clamp hasp 82 as indicated by arrows 74 in FIGS. 15 and 16. Then, each clamp handle 84 is rotated into the clamping position as indicated by arrow 76 in FIG. 17, thus firmly pressing each formed laminate 4 into intimate contact with its corresponding substrate shaped edge 32 and the portions of substrate upper face 36 and substrate lower face 38 adjacent substrate shaped edge 32 so that adhesive 22 can securely adhere the first and second formed laminates 4 to opposite ends of substrate 30 to produce a substrate/laminate assembly 40.

As may be observed in FIG. 9, a bonding press spine aperture 54 may be disposed through the bonding press spine 62 adjacent each clamp 80 to provide dimensional clearance for clamp handle 84 when the bonding press mold 64 to which it is mounted is rotated away from the other bonding press mold 64 in its bonding press 60, into the open position. Thus, clamp handle 84 may be disposed partially within an adjacent bonding press spine aperture 54 when the bonding press mold 64 to which it is mounted is rotated away from the other bonding press mold 64 in its bonding press 60, into the open position depicted in FIGS. 12 and 13.

Bonding press 60 may further comprise spacer 69 attached to bonding press spine 62 between a pair of bonding press hinges 70, as shown in FIGS. 12 and 13. A thickness of spacer 69 is substantially equal to the thickness of bonding press hinges 70 when bonding press mold hinges 70 are closed, thus providing a firm support for bonding press mold feet 68 when bonding press mold 60 is in the closed position as depicted in FIGS. 15-17.

To bond another substrate/laminate assembly 40, bonding fixture 50 may be further rotated to bring another bonding mold 60 into a position of easy accessibility, and the above process repeated with the second bonding mold 60, and so on.

In the preferred embodiment, adhesive 22 was a high-speed assembly glue, sprayed onto formed laminate inside surface 8 with commercially available adhesive spray apparatus. After adhesive 22 has cured, the resultant substrate/laminate assembly 40 may be removed from its bonding press 60 by loosening clamps 80 by moving clamp handle 84 by moving it opposite arrow 76 in FIG. 17, disengaging clamp arm 81 from clamp hasp 82 by moving clamp arm 81 opposite arrow 74 in FIG. 16, rotating bonding press molds 64 away from each other opposite arrows 72 in FIGS. 14 and 15, and removing substrate/laminate assembly 40 from its bonding press 60.

Substrate/laminate 40 is now ready to have its counter top edges 90 cut off from substrate/laminate assembly 40. This may be accomplished via a single cut, or in the preferred embodiment, via edge first cut 94 and edge second cut 96, as illustrated in FIGS. 18-20. FIG. 18 is an end view of substrate/laminate assembly 40, edge first cut 94, and edge second cut 96. Edge first cut 94 and edge second cut 96 may be accomplished using any appropriate cutting apparatus, including but not limited to a table saw, circular saw, cutting wheel, etc.

FIG. 19 is an end view of substrate/laminate assembly 40, an edge first cut 94 at an edge first cut angle 95, and an edge second cut 96 at an edge second cut angle 97. FIG. 20 is a right side quarter isometric view of counter top edge 90 which was produced by the instant apparatus and method.

Referring now to these figures, edge first cut 94 is initiated in the general location of the intersection of formed laminate upper leg 6 and formed laminate spine 5, and progresses generally towards formed laminate lower leg 7 at an edge first cut angle 95, slightly angled towards formed laminate spine 5. Edge first cut angle 95 is the angle between edge first cut 94 and a plane perpendicular to formed laminate upper leg 6 which contains the line of intersection of formed laminate upper leg 6 and formed laminate spine 5.

Edge second cut 96 is initiated in the general location of the intersection of formed laminate lower leg 7 and formed laminate spine 5, and progresses generally towards formed laminate upper leg 6 at an edge second cut angle 97, slightly angled towards formed laminate spine 5. Edge second cut angle 97 is the angle between edge second cut 96 and a plane perpendicular to formed laminate lower leg 7 which contains the line of intersection of formed laminate lower leg 7 and formed laminate spine 5. As may be observed in FIG. 20, the resultant counter top edge 90 then incorporates counter top edge upper face 98 (produced by edge first cut 94) adjacent counter top edge lower face 100 (produced by edge second cut 96).

In the preferred embodiment, edge first cut angle 95 and edge second cut angle 97 were 2½ degrees±2 degrees. The effect of this edge first cut angle 95 and edge second cut angle 97 on counter top edge 90 is to produce counter top edge 90 having a counter top edge upper face angle 102 and a counter top edge lower face angle 104 of slightly less than 90 degrees, specifically 87½ degrees±2 degrees. As may be observed in FIG. 19, counter top edge upper face angle 102 is the angle between counter top edge upper face 98 and a plane containing formed laminate upper leg 6, measured on the side of formed laminate spine 5 of counter top edge upper face 98. Counter top edge lower face angle 104 is the angle between counter top edge lower face 100 and a plane containing formed laminate lower leg 7, measured on the side of formed laminate spine 5 of counter top edge lower face 100.

An advantage of providing a counter top edge upper face angle 102 and a counter top edge lower face angle 104 slightly sharper than 90 degrees is to render the top surface and bottom surface intersections between counter top edge 90 and a counter top to which counter top edge 90 is subsequently adhered thinner, neater, and less conspicuous—in general, more aesthetically pleasing. In addition, such installation is virtually seamless, further increasing the aesthetics of the final counter top/counter top edge installation.

Counter top edge 90 is now ready to be attached to a counter top. This is generally accomplished with adhesive. Counter top 90 may be easily angle-cut as necessary to accommodate the corners, bump-outs, and indentations common in custom made counter installations.

While the drawings depict two formed laminates 4 adhered to two opposite substrate shaped edges 32 to produce substrate/laminate assembly 40, it is intended to fall within the scope of this disclosure that a single formed laminate 4 be adhered to a single substrate shaped edge 32 in order to produce a single counter top edge 90 per substrate/laminate assembly 40.

FIG. 21 is a right quarter side elevated isometric view of an alternate embodiment counter top edge 90 having a single countertop edge flat face 106. This configuration is achieved by making a single cut to cut countertop edge 90 off from substrate/laminate assembly 40, substantially perpendicular to a plane containing formed laminate upper leg 6.

FIG. 22 is a right quarter side elevated isometric view of an alternate embodiment counter top edge 90 having countertop edge flat face 106 and an alternate edge cross-sectional shape reminiscent of the lower portion of a tear drop. This figure is presented by way of example. As was mentioned previously, it is intended to fall within the scope of this disclosure that any cross-sectional edge shape may be formed into sheet laminate 2 and correspondingly into substrate shaped edge 32, including regular or irregular curves, regular or irregular polygonal, etc.

In the preferred embodiment, sheet laminate 2 was any appropriate post formable sheet laminate, e.g. in the order of 0.039-0.049 inch thick Formica™, Nevamar™, Wilsonart™ International, etc., and post formed using a conventional, commercially available, post form machine such as Evans Machinery, Inc. Model 0110 Post Former; modified as explained above.

Substrate 30 was particle board, wood, plastic, synthetic, or any other appropriate material to which formed laminate 4 is bondable. Bonding fixture 50 and bonding presses 60 were made of wood, metal, synthetic, or other appropriate material. Clamps 80 were commercially available clamps such as De-Sta-Co 334 pull action latch clamps.

While a preferred embodiment of the invention has been illustrated herein, it is to be understood that changes and variations may be made by those skilled in the art without departing from the spirit of the appending claims.

Drawing Item Index 2 sheet laminate
4 formed laminate
5 formed laminate spine
6 formed laminate upper leg
7 formed laminate lower leg
8 formed laminate inside surface
9 formed laminate outside surface
10 post form mold
11 clamping screw
12 post form mold shaping face
13 clamping screw head
14 post form mold face angle
15 clamping screw land
16 post form mold upper face
17 clamping screw threaded stud
18 post form mold lower face
19 post form mold threaded bore
20 arrow
21 post form mold upper lip
22 adhesive
23 post form mold slot
24 arrow
25 post form mold upper lip bore
26 arrow
27 arrow
28 arrow
30 substrate
32 substrate shaped edge
36 substrate upper face
38 substrate lower face
40 substrate/laminate assembly
50 bonding fixture
51 bonding fixture end
52 bonding fixture face
54 bonding press spine aperture
56 bonding fixture spindle
58 bonding fixture base
60 bonding press
62 bonding press spine
64 bonding press mold
65 bonding press mold face
66 bonding press groove
68 bonding press foot
69 spacer
70 bonding press hinge
71 arrow
72 arrow
73 arrow
74 arrow
76 arrow
77 arrow
78 arrow
80 clamp
81 clamp arm
82 clamp hasp
84 clamp handle
90 counter top edge
94 edge first cut
95 edge first cut angle
96 edge second cut
97 edge second cut angle
98 counter top edge upper face
100 counter top edge lower face
102 counter top edge upper face angle
104 counter top edge lower face angle
106 counter top edge flat face

I claim:

1. An apparatus to manufacture shaped counter top edges comprising a post form mold, and a bonding fixture;
   said post form mold comprising a post form mold upper face, a post form lower face, and a post form mold shaping face, an edge of said post form upper face being disposed adjacent an edge of said post form mold shaping face, an edge of said post form lower face being disposed adjacent an edge of said post form mold shaping face opposite said post form upper face; and
   said bonding fixture comprising at least one bonding press, each said bonding press comprising a pair of bonding press molds rotatably attached to a bonding press spine, each said bonding press mold comprising a bonding press mold face having a bonding press mold groove, and means of holding said bonding press molds such that their respective bonding press mold faces are substantially parallel and their bonding press mold grooves face each other and are substantially aligned and parallel with each other, said means of holding said bonding press molds comprising at least one clamp mounted to one said bonding press mold and a clamp hasp corresponding to each said clamp mounted to the other said bonding press mold, each said clamp hasp being mounted opposite its corresponding said clamp, each said clamp comprising a clamp arm sized to engage said clamp hasp, and a clamp handle whereby said clamp arm may be tightened and loosened on its corresponding said clamp hasp.

2. The apparatus to manufacture shaped counter top edges of claim 1 wherein said post form upper face and said post form lower face are disposed at a post form mold face angle of 30 degrees ±10 degrees to each other.

3. The apparatus to manufacture shaped counter top edges of claim 2 wherein each said bonding press mold further comprises a bonding press mold foot disposed adjacent to, and at a substantially ninety degree angle to, a respective said bonding press mold face.

4. The apparatus to manufacture shaped counter top edges of claim 3 wherein each said bonding press mold is rotatably attached to said bonding press mold spine by means of a bonding press hinge attached to a corresponding said bonding press mold along an edge of said bonding press mold foot opposite said bonding press mold face.

5. The apparatus to manufacture shaped counter top edges of claim 4 further comprising a spacer attached to each said bonding press spine between a pair of said bonding press mold hinges, a thickness of said spacer substantially equaling a thickness of one said bonding press hinge when said bonding press hinge is closed, whereby firm support is provided each said bonding press mold foot on said spacer, to hold each said bonding press mold foot substantially parallel to said bonding press spine when said bonding press molds are in a clamping position.

6. The apparatus to manufacture shaped counter top edges of claim 3 wherein said bonding press groove has a predetermined cross-sectional shape that is formed such that when a substrate having a substrate shaped edge having a cross-sectional shape that is substantially the same as the bonding press groove and a formed laminate are clamped within said bonding press grooves by the at least one clamp, the formed laminate conforms to the cross-sectional shape of the bonding press groove and to the cross-sectional shape of the substrate to define a formed laminate spine having a shape that is substantially the same as the bonding press groove and the substrate shaped edge.

7. The apparatus to manufacture shaped counter top edges of claim 3 wherein said bonding fixture comprises a plurality of said bonding presses attached at each end around a pair of bonding fixture ends, a shape of each said bonding fixture end being a polygon whose number of sides equals a number of said bonding presses.

8. The apparatus to manufacture shaped counter top edges of claim 7 further comprising a bonding fixture spindle extending through each said bonding fixture end, and a bonding fixture base disposed at each end of said bonding fixture, each end of said bonding fixture spindle resting on one said bonding fixture base, whereby said bonding fixture may be rotated relative to the bonding fixture bases.

9. The apparatus to manufacture shaped counter top edges of claim 3 further comprising a bonding press spine aperture corresponding to at least one said clamp, said bonding press spine aperture being sized and positioned to admit one said clamp handles.

10. The apparatus to manufacture shaped counter top edges of claim 3 wherein each said clamp is a pull action latch clamp.

11. An apparatus to manufacture shaped counter top edges comprising a post form mold and a bonding fixture;
    said post form mold comprising a post form mold upper face, a post form lower face, a post form mold shaping face, at least one clamping screw having a clamping screw threaded stud and a post form mold threaded bore corresponding to and mating with each said clamping screw, an edge of said post form upper face being disposed adjacent an edge of said post form mold shaping face, an edge of said post form lower face being disposed adjacent an edge of said post form mold shaping face opposite said post form upper face, and each of said post form mold threaded bore being disposed in said post form mold upper face; and
    said bonding fixture comprising at least one bonding press, each said bonding press comprising a pair of bonding press molds rotatably attached to a bonding press spine, each said bonding press mold comprising a bonding press mold face having a bonding press mold groove, and means of holding said bonding press molds such that their respective bonding press mold faces are substantially parallel and their bonding press mold grooves face each other and are substantially aligned and parallel with each other.

12. The apparatus to manufacture shaped counter top edges of claim 11 wherein said post form mold further comprises a post form mold upper lip disposed along a length of said post form mold opposite said post form mold upper face, said post form mold upper face and an underside of said post form mold upper lip defining a post form mold slot sized to admit sheet laminate.

13. The apparatus to manufacture shaped counter top edges of claim 12 wherein said clamping screw further comprises a clamping screw head and a substantially planar clamping screw land, said clamping screw threaded stud extending substantially perpendicularly from said clamping screw land, said clamping screw head being disposed adjacent said clamping screw land opposite said clamping screw threaded stud, whereby an action of tightening said clamping screw threaded stud into said post form mold threaded bore has an effect of clamping sheet laminate disposed within said post form mold slot between said clamping screw land and said post form mold upper face.

14. The apparatus to manufacture shaped counter top edges of claim 13 wherein said post form mold further comprises a post form mold upper lip bore corresponding to and opposite each said post form mold threaded bore, each said post form mold upper lip bore being sized to slidably admit said clamping screw threaded stud, said clamping screw land, and said clamping screw head.

15. An apparatus to manufacture shaped counter top edges comprising a bonding fixture comprising at least one bonding press, wherein:
- each of said bonding press comprising a pair of bonding press molds rotatably attached to a bonding press spine, each of said bonding press mold comprising a bonding press mold face having a bonding press mold groove, means of holding said bonding press molds such that their respective bonding press mold faces are substantially parallel and their bonding press mold grooves face each other and are substantially parallel with each other;
- said means of holding said bonding press molds comprises at least one clamp mounted to one said bonding press mold, and a clamp hasp corresponding to each said clamp mounted to the other said bonding press mold, said clamp hasp being mounted opposite its corresponding said clamp, said clamp comprising a clamp arm sized to engage said clamp hasp, and a clamp handle whereby said clamp may be tightened and loosened;
- each of said bonding press mold further comprises a bonding press mold foot disposed adjacent to, and at a substantially ninety degree angle to, a respective said bonding press mold face; and
- each of said bonding press mold is rotatably attached to said bonding press mold spine by means of a bonding press hinge attached to said bonding press mold along an edge of said bonding press mold foot opposite said bonding press mold face.

16. The apparatus to manufacture shaped counter top edges of claim 15 further comprising a spacer attached to each said bonding press spine between a pair of said bonding press mold hinges, a thickness of said spacer substantially equaling a thickness of one said bonding press hinge when said bonding press hinge is closed, whereby firm support is provided each said bonding press mold foot on said spacer substantially parallel to said bonding press spine when said bonding press molds are in a clamping position.

17. The apparatus to manufacture shaped counter top edges of claim 15 wherein said bonding press groove has a predetermined cross-sectional shape that is formed such that when a substrate having a substrate shaped edge having a cross-sectional shape that is substantially the same as the bonding press groove and a formed laminate are clamped within said bonding press grooves by the at least one clamp, the formed laminate conforms to the cross-sectional shape of the bonding press groove and to the cross-sectional shape of the substrate to define a formed laminate spine having a shape that is substantially the same as the bonding press groove and the substrate shaped edge.

18. The apparatus to manufacture shaped counter top edges of claim 15 wherein said bonding fixture comprises a plurality of said bonding presses attached at each end around a pair of bonding fixture ends, a shape of each said bonding fixture end being a polygon whose number of sides equals a number of bonding presses.

19. The apparatus to manufacture shaped counter top edges of claim 18 further comprising a bonding fixture spindle extending through each said bonding fixture end, and a bonding fixture base disposed at each end of said bonding fixture, each end of said bonding fixture spindle resting on one said bonding fixture base, whereby said bonding fixture may be rotated relative to said bonding fixture bases.

20. The apparatus to manufacture shaped counter top edges of claim 19 further comprising a bonding press spine aperture corresponding to at least one said clamp, said bonding press spine aperture being sized and positioned to admit one said clamp handle.

* * * * *